United States Patent
Shigetaka

(10) Patent No.: US 7,347,406 B2
(45) Date of Patent: Mar. 25, 2008

(54) SHUT-OFF VALVE AND METHOD OF SHUTTING OFF OPENING OF VACUUM CHAMBER

(75) Inventor: Kenjiro Shigetaka, Chigasaki (JP)

(73) Assignee: Koichi ONODERA, Kanagawa (JP)

( * ) Notice: Subject to any disclaimer, the term of this patent is extended or adjusted under 35 U.S.C. 154(b) by 47 days.

(21) Appl. No.: 11/110,841

(22) Filed: Apr. 21, 2005

(65) Prior Publication Data

US 2005/0248080 A1   Nov. 10, 2005

(30) Foreign Application Priority Data

Apr. 21, 2004   (JP) .......................... P2004-126011

(51) Int. Cl.
*F16K 25/00* (2006.01)

(52) U.S. Cl. ...................... 251/161; 251/183; 251/188; 251/309

(58) Field of Classification Search ................. 251/158, 251/160, 161, 167, 176, 180, 181, 182, 183, 251/185, 187, 188, 189, 192, 304, 309
See application file for complete search history.

(56) References Cited

U.S. PATENT DOCUMENTS 2,746,712 A * 5/1956 Wickman ................... 251/109
2,825,528 A * 3/1958 Truitt ......................... 251/175
4,157,169 A * 6/1979 Norman ..................... 251/195
5,137,258 A * 8/1992 Takamatsu .................. 251/160
6,206,029 B1 * 3/2001 Onodera ..................... 137/334

FOREIGN PATENT DOCUMENTS

JP      11-351448      12/1999

* cited by examiner

*Primary Examiner*—John K. Fristoe, Jr.
(74) *Attorney, Agent, or Firm*—Young & Thompson

(57) ABSTRACT

A shut-off valve disposed between openings formed to a vacuum chamber includes a casing, a valve body disposed inside the casing and having a shaft rotating around a central axis of the valve body, a drive unit for driving the valve body to rotate the shaft, and an open/close mechanism provided for the shaft for opening and closing each of the openings. The open/close mechanism includes a sheet member mounted to the shaft so as to protrude outward in a radial direction of the shaft to thereby close each of the openings, an urging member urging the sheet member inward or outward in the radial direction of the shaft, and a seal member connected to the sheet member so as to be associated therewith and forming a sealed space between the sheet member and the shaft, which is formed with an air passage communicating with the sealed space.

4 Claims, 6 Drawing Sheets

SHUT-OFF VALVE AND METHOD OF SHUTTING OFF OPENING OF VACUUM CHAMBER

BACKGROUND OF THE INVENTION

1. Field of the Invention

The present invention relates to a shut-off (open/close) valve for shutting off (opening and closing) openings formed to a vacuum chamber and also relates to a method of shutting off the openings by using such shut-off valve.

2. Related Art

A shut-off valve provided for opening or closing a vacuum chamber of a vacuum device such as semiconductor manufacturing device has been variously studied and developed, and the inventor of the subject application had already provided such shut-off valve as disclosed, for example, in Japanese Patent Laid-Open (KOKAI) Publication No. HEI 11-351448.

The shut-off valve disclosed in this publication is arranged horizontally between lateral vacuum chambers. This shut-off valve comprises a valve seat having lateral communication openings, a valve body which is arranged to be rotatable and movable in an axial direction of the valve seat and a driving mechanism for rotating and moving the valve body in the axial direction. An O-ring is further provided to the outer peripheral surface of the valve body so as to surround the communication openings of the valve seat to thereby surely seal the openings.

In the above aspect, it may be said that the shut-off valve of the structure mentioned above is superior in the point of ensuring the vacuum condition at high performance in the vacuum chamber. However, with such shut-off valve, the O-ring is rubbed against the inner surface of a casing of the vacuum device every time the valve body rotates, which may cause, so-called, particles, thus being inconvenient.

SUMMARY OF THE INVENTION

An object of the present invention is therefore to substantially eliminate defects or drawbacks encountered in the prior art mentioned above and to provide an shut-off valve free of occurrence of particles with high sealing performance being maintained for a long time.

Another object of the present invention is to provide a method of opening or closing the shut-off valve of the characters mentioned above.

These and other objects of the present invention can be achieved according to the present invention by providing, in one aspect, a shut-off valve disposed between openings formed to a vacuum chamber comprising:

a casing;

a valve body disposed inside the casing and having a shaft rotating around a central axis of the valve body;

a drive unit for driving the valve body to rotate the shaft; and an open/close mechanism provided for the shaft for opening and closing each of the openings, the open/close mechanism including a sheet member mounted to the shaft so as to protrude outward in a radial direction of the shaft to thereby close each of the openings, an urging member urging the sheet member inward or outward in the radial direction of the shaft, and a seal member connected to the sheet member so as to be associated therewith and forming a sealed space between the sheet member and the shaft, the shaft being formed with an air passage communicating with the sealed space.

In preferred examples of this aspect, it is desired that the casing has a wall portion to which communication ports are formed so as to correspond to the openings formed to the vacuum chamber, respectively, the valve body is disposed inside the casing so that the central axis of the shaft accords with a longitudinal axis of the casing, the sheet member of the open/close mechanism acts to open and close the communication port of the casing to thereby open or close the opening of the vacuum chamber.

The open/close mechanisms may be disposed to portions symmetric with respect to the central axis of the shaft so that the sheet members of the respective open/close mechanisms reciprocate on a same straight line.

It may be desired that the shaft is formed with a communication passage penetrating in a diameter direction thereof and the open/close mechanisms are disposed on both sides of the communication passage.

In another aspect of the present invention, there is provided a method of shutting off openings of a vacuum chamber by using a shut-off valve, disposed between openings formed to a vacuum chamber, which comprises a casing, a valve body disposed inside the casing and having a shaft rotating around a central axis of the valve body, a drive unit for driving the valve body to rotate the shaft, and an open/close mechanism provided for the shaft for opening and closing each of the openings, wherein the open/close mechanism includes a sheet member mounted to the shaft so as to protrude outward in a radial direction of the shaft so as to close each of the openings, an urging member urging the sheet member inward or outward in the radial direction of the shaft, and a seal member connected to the sheet member so as to be associated therewith and forming a sealed space between the sheet member and the shaft, and the compressed air is fed into the sealed space to pressurize an inner space thereof so as to protrude the sheet member against the urging force of the urging member and to close the opening of the vacuum chamber.

In this aspect, it may be desired that the feeding of the compressed air is stopped under the sheet member being protruded and an inside air in the sealed space is sucked to reduce the pressure therein, thereby pulling the sheet member inward in a radial direction of the shaft utilizing the urging force of the urging member and then separating the sheet member from the opening of the vacuum chamber to open the same, and under the sheet member being pulled towards the shaft, the sucking of the sealed space is stopped and the compressed air is fed again to pressurize the inside of the sealed space to thereby protrude the sheet member.

In a further aspect of the method of the present invention, there is also provided a method of shutting off openings of a vacuum chamber by using a shut-off valve, disposed between openings formed to a vacuum chamber, which comprises a casing, a valve body disposed inside the casing and having a shaft rotating around a central axis of the valve body, a drive unit for driving the valve body to rotate the shaft, and an open/close mechanism provided for the shaft for opening and closing each of the openings, wherein the open/close mechanism includes a sheet member mounted to the shaft so as to protrude outward in a radial direction of the shaft to thereby close each of the openings, an urging member urging the sheet member inward or outward in the radial direction of the shaft, and a seal member connected to the sheet member so as to be associated therewith and forming a sealed space between the sheet member and the shaft, and an air in the sealed space is sucked to thereby reduce a pressure in the sealed space and attract the sheet member towards the central axis of the shaft against the urging force of the urging member, thereby separating the sheet member closing the opening from the closed state thereof to open the same.

In this aspect, it may be desired that the sucking of the air in the sealed space is stopped under the sheet member being pulled towards the shaft, and the compressed air is fed in the sealed space to thereby pressurize the inside of the sealed space and then protrude the sheet member so as to close the each of the openings of the vacuum chamber, and under the sheet member being protruded, the feeding of the compressed air is stopped and the air in the sealed space is sucked again to reduce the pressure therein, thereby pulling the sheet member inward in a radial direction of the shaft utilizing the urging force of the urging member.

In a still further aspect of the method of the present invention, there is provided a method shutting off openings of a vacuum chamber by using a shut-off valve, disposed between openings formed to a vacuum chamber, which comprises a casing, a valve body disposed inside the casing and having a shaft rotating around a central axis of the valve body, a drive unit for driving the valve body to rotate the shaft, and an open/close mechanism provided for the shaft for opening and closing each of the openings, wherein the open/close mechanism includes a sheet member mounted to the shaft so as to protrude outward in a radial direction of the shaft so as to close each of the openings, an urging member urging the sheet member inward or outward in the radial direction of the shaft, and a seal member connected to the sheet member so as to be associated therewith and forming a sealed space between the sheet member and the shaft, and a compressed air is fed into the sealed space to thereby pressurize the inside thereof to thereby attract the sheet member closing the opening of the vacuum chambers against the urging force of the urging member and to open the opening.

In this aspect, it may be desired that the feeding of the compressed air is stopped under the sheet member being protruded and an inside air in the sealed space is sucked to reduce the pressure therein, thereby protruding the sheet member outward in a radial direction of the shaft utilizing the urging force of the urging member and then pushing the sheet member against the opening of the vacuum chamber to close the same, and under the sheet member being protruded, the sucking of the sealed space is stopped and the compressed air is fed again to pressurize the inside of the sealed space to thereby attract the sheet member.

Furthermore, in a preferred example of the above aspects of the valve shut-off method, it may be desired that the valve body is disposed in the casing, having a wall section opposing to the communication ports communicated with the openings of the vacuum chamber, respectively, such that the shaft of the valve body is coincident with an axis extending in a longitudinal direction of the casing, and the openings are opened and closed by opening and closing the communication ports by the sheet member.

According to the invention of the structures and characters mentioned above, the rubbing between the sheet member of the valve opening/closing mechanism and the casing of the shut-off valve can be effectively prevented from causing, and accordingly, even in the mounting of an O-ring or like to the end surface of the sheet member, the sheet member be never worn, whereby substantially no particle is generated and an improved sealing performance can be maintained for a long period.

The nature and further characteristic features of the present invention will be made more clear from the following descriptions made with reference to the accompanying drawings.

DESCRIPTION OF THE PREFERRED EMBODIMENT

Preferred embodiments of a shut-off (open/close) valve according to the present invention will be described hereunder.

Figure 1:
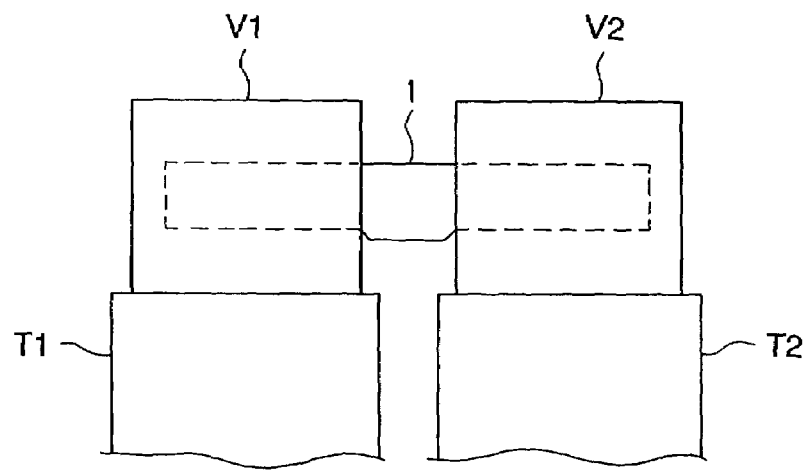
FIG. 1 is an illustrated front view of a vacuum chamber in which an shut-off valve according to one embodiment of the present invention is disposed.

First, with reference to FIG. 1, a shut-off valve 1 is arranged between a lateral pair of vacuum chambers V (V1 and V2) mounted on tables T (T1 and T2), respectively, and a driving mechanism 50 (FIG. 2) of the shut-off valve 1 so as to project horizontally of the vacuum chambers V. The vacuum chambers V1 and V2 are provided with openings opposing to each other. The horizontally projecting arrangement of the driving mechanism 50 contributes to easy maintenance thereof.

Figure 2:
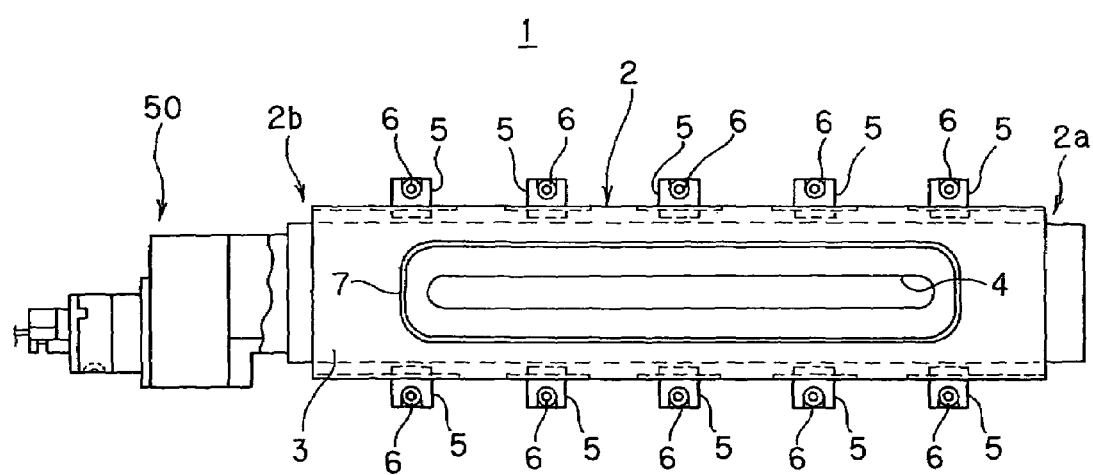
FIG. 2 is a side view of the shut-off valve of FIG. 1.
Figure 3:
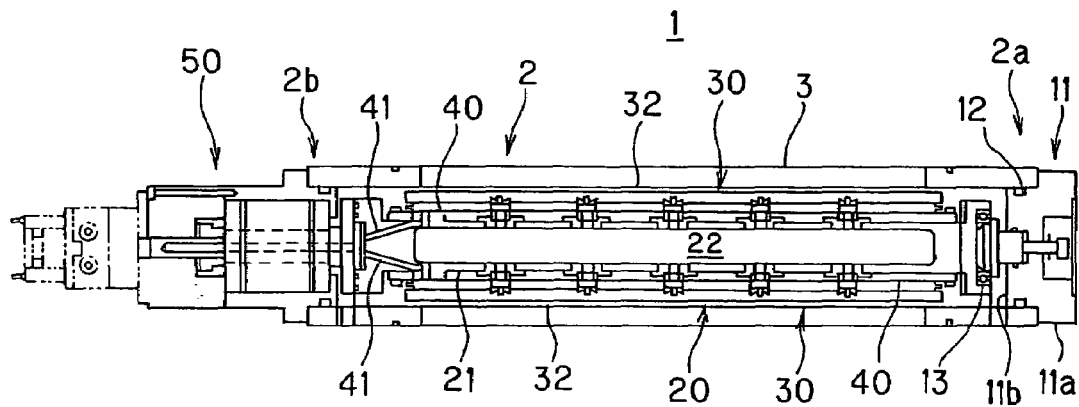
FIG. 3 is a plan view of the shut-off valve opened for showing inner structure.
Figure 4:
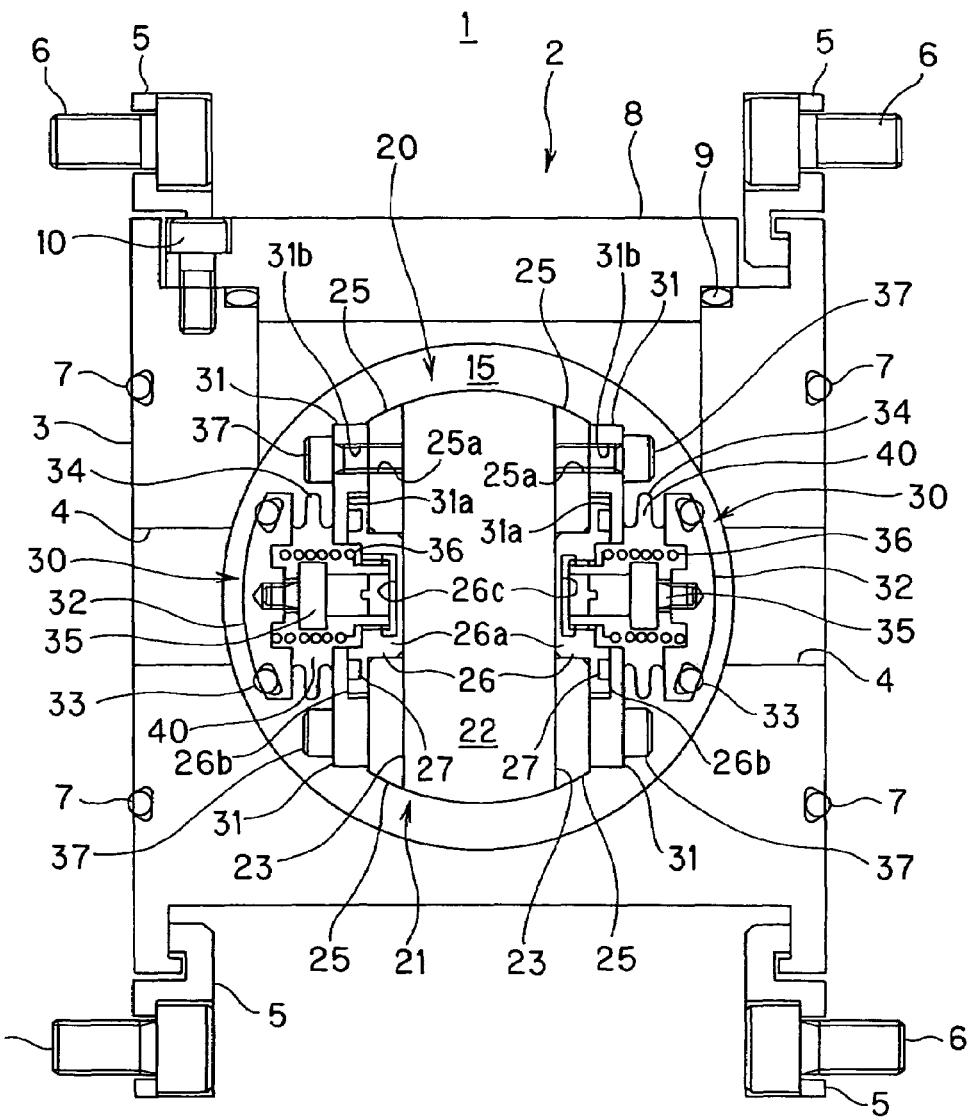
FIG. 4 is an illustrated cross sectional view of the shut-off valve.

Next, referring to FIGS. 2 to 4, the shut-off valve 1 comprises a casing 2 having substantially a rectangular shape, a spool body (i.e., valve body) 20 arranged inside the casing 2 and a driving mechanism or section 50 mounted to an axial one end portion of the casing 2 and adapted to drive the spool body 20.

The casing 2, on the other hand, includes a casing body 3 having an opened front end portion 2a, an opened base end portion 2b and side portions one of which is also opened, a cap 11 closing the opened front end portion 2a, and a wall piece 8 closing the opened one side portion. The wall piece 8 is fixed to the casing body 3 by clamping the same by using a hexagon socket bolt 10. A seal member 9 is interposed at a mating portion between the wall piece 8 and the casing body 3 to thereby prevent leakage of air through the mating portion. On the other hand, the cap 11 is a member provided with an end face portion 11a and an insertion portion 11b, and by inserting the insertion portion 11b into a hole defined by the casing body 3 and the wall piece 8, the front end portion 2a of the casing 2 can be sealed. An O-ring 12 is fitted around the outer periphery of the insertion portion 11b so as to seal the mating portion between the casing body 3, the wall piece 8 and the insertion portion 11b of the cap 11.

The casing body 3 constituting the casing 2 is formed with slots at its opposing side surfaces so as to extend in the axial direction of the casing 2. These slots are formed as communication ports 4 communicated with the openings formed to the vacuum chambers V (V1, V2) An O-ring 7 is fitted to the outer periphery of the casing 2 around each of the communication ports 4 so as to seal the mating portion between the casing 2 and the vacuum chamber V. In addition, the casing body 3 is provided with a plurality of seats or washers 5 properly arranged in the axial direction at upper and lower portions of the side surfaces to which the communication ports 4 are formed. Fixing or mounting bolts 6 are inserted through the respective seats 5 to thereby fix the shut-off valve 1 to the vacuum chambers V.

The casing 2 constituted by these casing body 3, the wall piece 8 and the cap 11 has an inner space 15 extending cylindrically in the axial direction, in which the spool body 20 is accommodated.

The spool body 20 is provided with a shaft 21 extending axially in the space 15 and open/close mechanisms 30, 30 for opening or closing the communication ports 4, respectively, the open/close mechanisms 30, 30 being arranged symmetrically with respect to the center axis of the shaft 21.

The shaft 21 has a front end supported by the cap 11 through a bearing 13 and a base end connected to the driving mechanism 50, on the other hand.

The open/close mechanisms 30 have mount portions which are symmetrically formed to the outer peripheral surface of the shaft 21 on both side portions, so as to extend along the axial direction thereof, with the center axis of the shaft 21 being the center of this symmetrical arrangement. The mount portions are provided with mount seats 25, 25 disposed integrally formed with the shaft 21 and support members 26, 26 disposed between these mount seats 25, 25, these seats and support members being arranged at the central portions of the mount portions with an interval in the width direction thereof.

Each of the mount seats 25 is formed with a plurality of screw holes 25a in the axial direction with an equal interval between adjacent ones. On the other hand, each of the support members 26 is provided with a fitting portion 26a fitted to a groove formed between the respective mount seats 25 and a flanged portion 26b extending outward from an upper end of the fitting portion 26a, the fitting portion 26a and the flanged portion 26b being formed integrally. The support member 26 is also formed with recesses 26c with a predetermined depth from the upper end surface thereof with a predetermined interval in the axial direction thereof. Further, the open/close mechanism 30 has a support column 35, which is inserted into the recess 26c, as will be mentioned hereinlater, and an O-ring 27 is fitted to the upper end surface of the flanged portion 26b.

Furthermore, the shaft 21 is formed with a communication passage 22 penetrating therethrough in the diameter direction, and accordingly, the mount portions of the open/close mechanisms 30 are disposed symmetrically with respect to the communication passage on both sides thereof. This communication passage 22 is formed along the axial direction so as to correspond to the length of the communication port 4.

Each of the open/close mechanisms 30 is provided with a mount member 31 fastened by a bolt to the mount seat 25 of the shaft 21, a sheet member 32 for closing the communication port 4 formed to the casing 2 and a bellows 34 connecting the sheet member 32 and the mount member 31. The open/close mechanism 30 further includes a support column 35 supported by the supporting portion 26 of the shaft 21 and adapted to prevent the positional shift of the sheet member 32 to the shaft 21 and includes a spring 36 serving to pull the sheet member 32 towards the central side of the shaft 21 or urge the sheet member 32 outward in the radial direction thereof.

The sheet member 32 is an elongated plate-like member formed of aluminum alloy or stainless alloy and is provided at the front end portion of the open/close mechanism 30. The sheet member 32 has a circular-arc-shaped outer peripheral surface, and the length and width of the sheet member 32 are determined such that an outer edge portion thereof extends over the peripheral edge portion of the communication port 4 of the casing 2. Further, aluminum may be flame-fused on the outer peripheral surface of the sheet member 32, and an O-ring 33 may be fitted to a position slightly inside the outer peripheral surface of the sheet member 32. This O-ring 33 serves to shut off the communication between the communication port 4 and the inside space 15 of the casing 2 when the sheet member 32 closes the communication port 4, thus preventing the leaking from the mating surface therebetween.

On the other hand, the mount member 31 is provided, in the lower surface thereof, with a groove 31a so that the flanged portion 26b of the support member 26 is fitted in this groove 31a on the center side between the mount member 31 and the mount seat 25. The mount member 31 is also formed with a plurality of screw holes 31b at a thickened portion on the outside of the groove 31a. These holes 31b are positioned so as to correspond to the screw holes 25a formed to the mount seat 25. The flanged portion 26b of the support member 26 is fitted inside the groove 31a of the mount member 31, so that when the mount seat 25 and the mount member 31 are laminated, the screw holes 25a and 31b formed thereto are coincident with each other and then fastened to the shaft 21 by means of bolts 37. The O-ring 27 fitted to the upper surface of the flanged portion 26b of the support member 26 seals the mating portion between the flanged portion 26b and the mount member 31.

Figure 5:
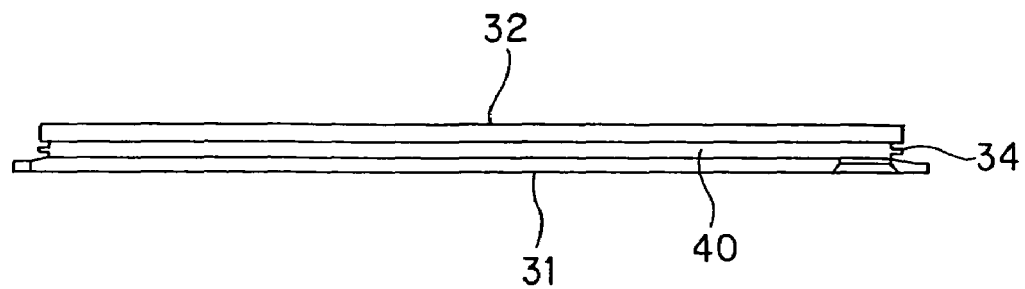
FIG. 5 is a side view of a bellows to be mounted to a spool body (i.e., valve body) of the shut-off valve.

The lower surface of the sheet member 32 and the upper surface of the mount member 31 are connected, as shown in FIG. 5, by means of the bellows 34, which is a member for achieving a sealing function, and a sealed space 40 is defined by this bellows 34, the sheet member 32, the mount member 31 and the support member 26. The bellows 34 has an intermediate portion positioned between the sheet member 32 and the mount member 31, the intermediate portion being protruded outward so as to provide an accordion-like structure to be shrinkable in the axial direction of the support column 35 in accordance with the movement of the sheet member 32.

The bellows 34 may be integrated with the sheet member 32 and/or mount member 31 as welded bellows or molded bellows, or may be formed to be independently but to be detachable therefrom. The bellows 34 may be formed of, for example, aluminum alloy, stainless alloy or titanium alloy.

Further, in order to form the sealed space 40, such bellows 34 may be substituted with fluorocarbon lining or fluorocarbon rubber.

The support columns 35 are disposed on the rear surface of the sheet member 32 with predetermined interval along its longitudinal direction so as to be perpendicular to the sheet member 32. The position to which the support member 26 is mounted is coincident with the position of the recess 26c with respect to the shaft 21. The rear end of the support column 35 is inserted into the recess 26c of the support member 26 to be reciprocal with respect to the support member 26 of the shaft 21.

The spring 36 arranged around the outer periphery of the support column 35 has one end secured to the rear surface of the sheet member 32 and the other end secured to the support member 26 of the shaft 21. The spring 36 acts to connect the sheet member 32 and the support member 26 in a slightly expanded state or compressed state from its natural length. In the expanded state of the spring 36 from the natural state, the sheet member 32 is pulled (attracted) towards the center of the shaft 21, and on the other hand, in the compressed state from the natural state, the sheet member 32 is urged outward in the radial direction thereof.

According to the open/close mechanisms 30 having the structure mentioned above, the sheet members 32 perform reciprocal motion so as to protrude outward from the shaft 21 in the radial direction with the locus on the same straight lines with the central axis of the shaft 21 being symmetric.

At the base end portion of the shaft 21, the driving mechanism 50 side and the outer peripheral surface of the shaft 21 corresponding to the position at which the sealed space 40 is formed are communicated through the air passage 41. Further, a compressor and a vacuum device, both not shown, disposed outside the shut-off valve 1, are connected to the air passage 41 from the side of the driving mechanism 50.

Figure 6:
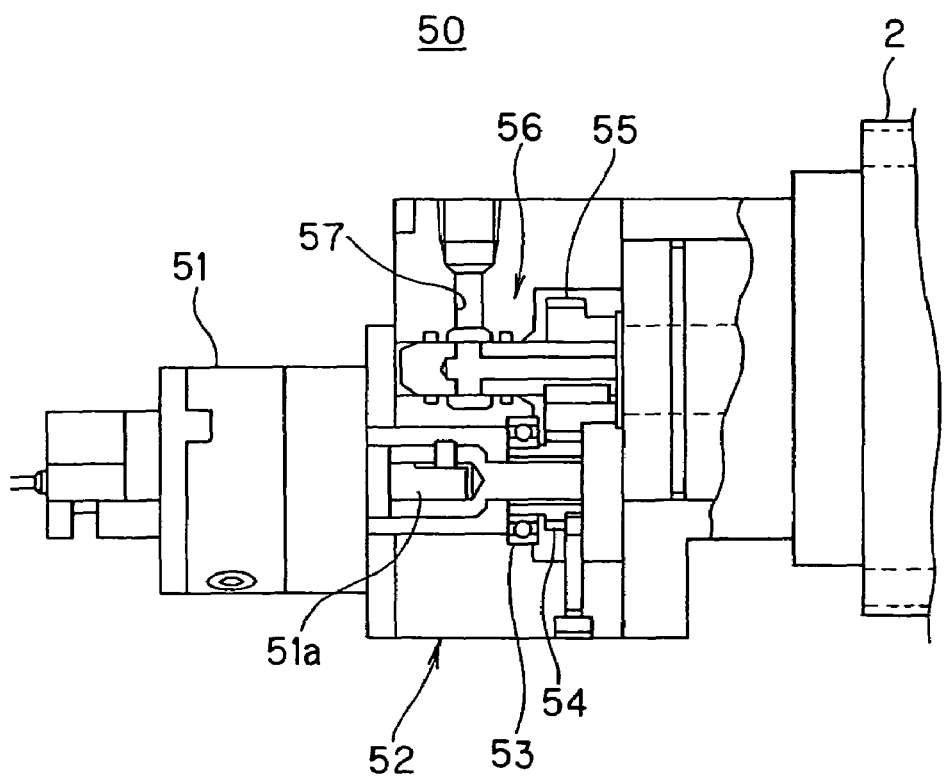
FIG. 6 is a partial sectional view of a driving mechanism for the shut-off valve.

FIG. 6 shows the details of this driving mechanism 50. The driving mechanism 50 includes a rotor actuator 51 and a gear box 52. The rotor actuator 51 acts to rotate the spool body 20 around its central axis, and the gear box 52 is disposed between the rotor actuator 51 and the casing 2 so as to transmit the driving force from the driving mechanism to the shaft 21 of the spool body 20. The rotor actuator 51 has its rotational shaft 51a which is inserted into the gear box 52 and coupled with a gear 54 through a bearing 53. Inside the gear box 52, the gear 54 is meshed alternately with a gear 55 disposed in parallel to the gear 54. The base end portion of the shaft 21 is connected to this gear 55, and the gear 55 is also connected to a magnetic-fluid-seal-through-hole type joint 56. This joint 56 is formed with the air passage 41, mentioned hereinbefore, to which the compressor and vacuum device, both not shown, are connected. The joint 56 also has an air passage 57 formed inside thereof and acts to rotate the gear 55 with no leakage of the air passing inside the air passage 57.

The shut-off valve 1 of the structures and characters mentioned above will operate as follows.

Figure 7:
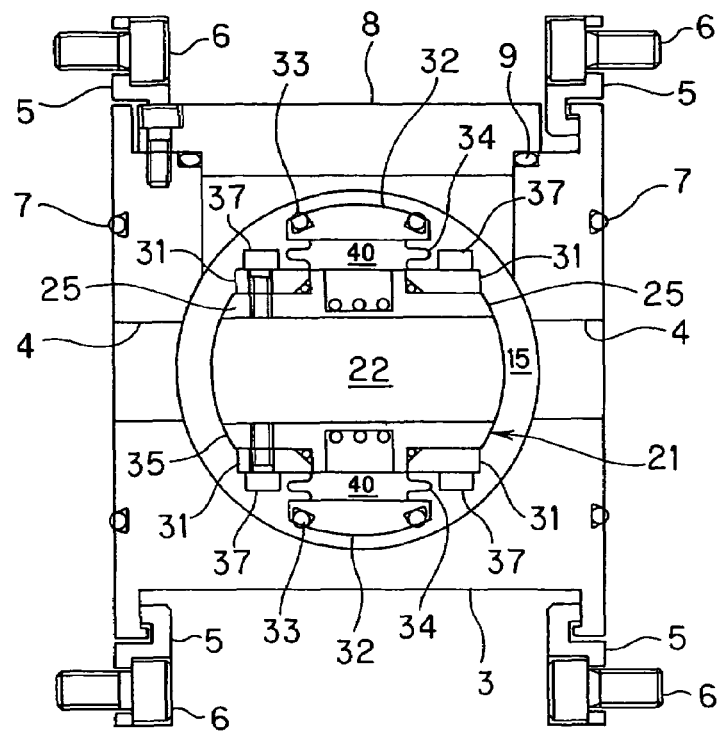
FIG. 7 is an illustration showing an arrangement of the opened spool body.

FIG. 7 represents the opened state of the shut-off valve 1, in which both the communication ports 4 of the casing 2 are opened and communicated with each other, and in this opened state, the communication ports 4 and the communication passage 22 formed to the shaft 21 are formed so as to be aligned with each other. The open/close mechanisms 30, 30 are disposed above and below the communication passage 22.

First, a case, in which the spring 36 of each open/close mechanism 30 is attached in the elongated state from the natural length and the sheet member 32 is attracted towards the center of the shaft 21, will be described.

In such opened state shown in FIG. 7, the air inside the sealed space 40 is sucked by the vacuum device and the sheet member 32 is attracted towards the central side of the shaft 21 by the urging force of the spring 36.

Figure 8:
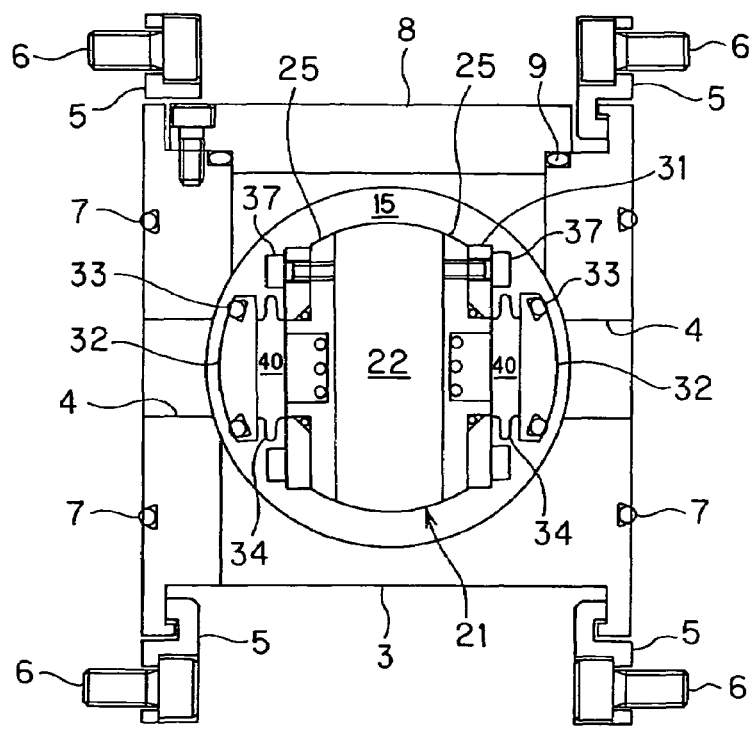
FIG. 8 is an illustration showing the arrangement of the closed spool body rotated by 90 degrees from the state of FIG. 7.
Figure 9:
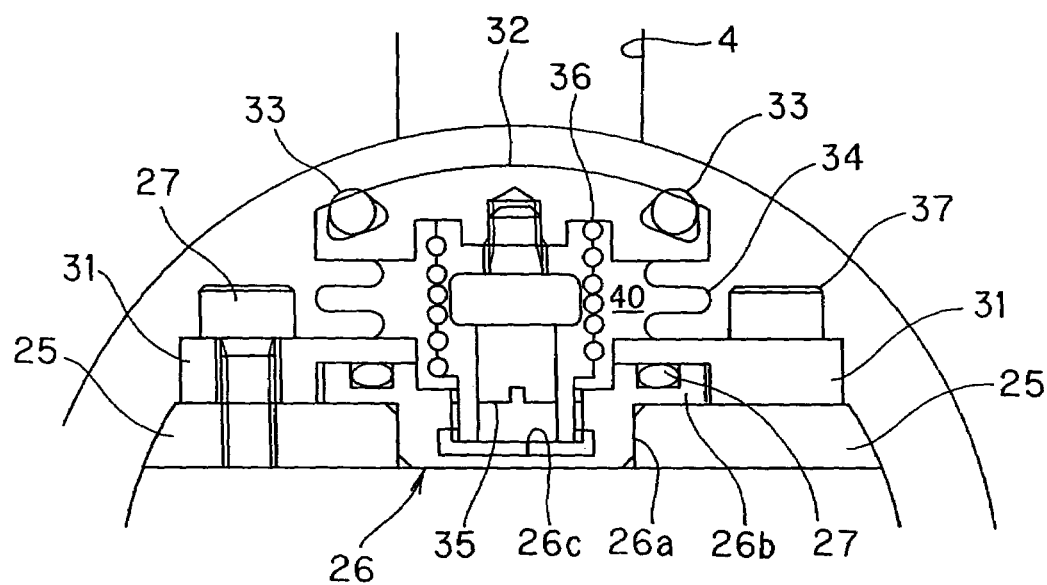
FIG. 9 shows a sheet member, in an enlarged scale, in the state of FIG. 8.
Figure 10:
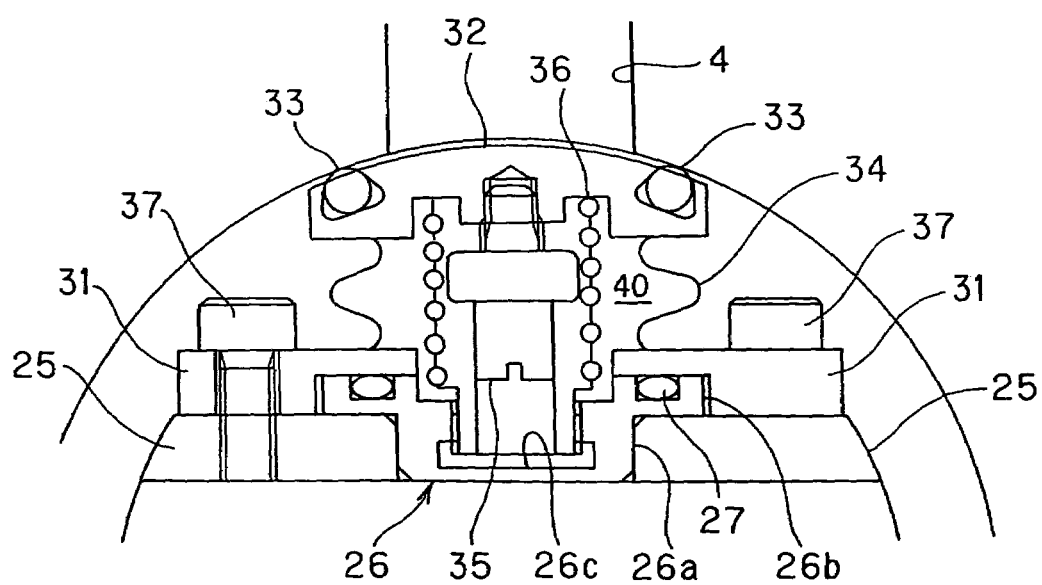
FIG. 10 shows the sheet member in a closed state, in an enlarged scale.

FIG. 8 represents a state just before the shut-off valve 1 has been closed. In this state, the spool body 20 is rotated by the rotor actuator 51 by 90 degrees from the state shown in FIG. 7. According to this motion, the sheet members 32 move so as to face the communication ports 4 of the casing 2, and the communication passage 22 is directed to the vertical direction as viewed. In order to close the shut-off valve 1 from this state, the vacuuming operation of the vacuum device is stopped and the compressed air is fed by the compressor into the sealed space 40. When the compressed air is fed into the sealed space 40, the inside thereof is pressurized. Then, the sheet member 32 moves so as to protrude outward in the radial direction of the shaft 21 against the urging force of the spring 36 from the state in which the sheet member 32 is attracted towards the central side of the shaft 21, as shown in FIG. 9. According to such motion, as shown in FIG. 10, the sheet member 32 closes the communication port 4 of the casing 2. In this instance, the O-ring 33 fitted to the upper surface of the spool member surely shut off the communication between the communication port 4 and the inside space of the casing 2. Of course, both the open/close mechanisms 30, 30 act in the same manner.

Next, when it is required to again take the opened state of the shut-off valve 1 from the closed state, the vacuum device is operated to release the compressed air from the sealed space 40. Then, the sheet member 32 is again attracted towards the central side of the shaft 21 by the urging force of the spring 36, thus taking the state shown in FIGS. 8 and 9. Thereafter, by reversely rotating the spool body 20, the communication ports 4 of the casing 2 and the communication passage 22 of the shaft 21 are linearly aligned as shown in FIG. 7.

Further, in this embodiment, the vacuum device may be eliminated and only the compressor may be utilized. In such case, when required to protrude the sheet member 32 outward, the compressor is operated to thereby feed the compressed air into the sealed space 40, whereby the sheet member 32 moves so as to protrude outward against the urging force of the spring 36. On the other hand, when required to attract the sheet member 32 towards the central side of the shaft 21, the operation of the compressor is stopped and the compressed air in the sealed space 40 is extracted to thereby reduce the inner pressure of the space 40 to the normal pressure, whereby the sheet member 32 is attracted towards the central side of the shaft 21 by the urging force of the spring 36.

Contrary to the above operation, the shut-off valve 1 will operate as follows in the case where the springs 36 of the open/close mechanisms 30, 30 are disposed in the state compressed from the natural length and the sheet members 32 are urged outward in the radial direction of the shaft 21.

In this operation, in the state shown in FIG. 7, the inside of the sealed space 40 becomes a negative pressure state through the air-sucking of the vacuum device. According to this negative pressure state, the sheet member 32 is attracted towards the central side of the shaft 21 against the urging force of the spring 36.

On the other hand, as shown in FIG. 8, in the state just before the shut-off valve 1 has been closed, the spool body 20 is rotated by the rotor actuator 51 by 90 degrees from the state shown in FIG. 7. According to this motion, the sheet members 32 move to the position facing the communication ports 4 of the casing 2, and the communication passage 22 is directed to the vertical direction as viewed in FIG. 8. In order to close the shut-off valve 1 from this state, the vacuuming operation of the vacuum device is stopped and the air compressed by the compressor is fed into the sealed space 40. Then, as shown in FIG. 9, the sheet member 32 moves so as to protrude outward in the radial direction against the urging force of the spring 36 from the state in which the sheet member 32 is attracted towards the central side of the shaft 21. According to such motion, as shown in FIG. 10, the sheet member 32 closes the communication port 4 of the casing 2. In this instance, the O-ring 33 fitted to the upper surface of the spool member surely shuts off the communication between the communication port 4 and the inside space of the casing 2.

Next, when it is required to take the opened state of the shut-off valve 1 from the closed state, the compressor is stopped in its operation and the vacuum device is again operated to make negative the pressure in the sealed space 40. According to this operation, the sheet member 32 is again attracted towards the central side of the shaft 21 by the urging force of the spring 36, thus taking the state shown in FIGS. 8 and 9. Thereafter, by reversely rotating the spool body 20, the communication ports 4 of the casing 2 and the communication passage 22 of the shaft 21 take the linearly aligned state as shown in FIG. 7.

Further, in this embodiment, the compressor may be eliminated and only the vacuum device may be utilized. In such case, when required to protrude the sheet member 32 outward, the vacuum device is stopped in its operation and the normal pressure state is hence created in the sealed space 40, whereby the sheet member 32 moves so as to protrude outward only by the urging force of the spring 36. On the other hand, when required to attract the sheet member 32 towards the central side of the shaft 21, the vacuum device is operated to make negative the pressure in the sealed space 40, whereby the sheet member 32 is attracted towards the central side of the shaft 21 against the urging force of the spring 36.

It is to be noted that, in the above embodiment and an embodiment described hereinafter, the mechanisms, members and the like, such as open/close mechanism, disposed symmetrically with respect to the shaft (central axis thereof) operate or are operated in substantially the same manner to open or close the communication ports, respectively, even if only these mechanisms and members are described as single one.

Figure 11:
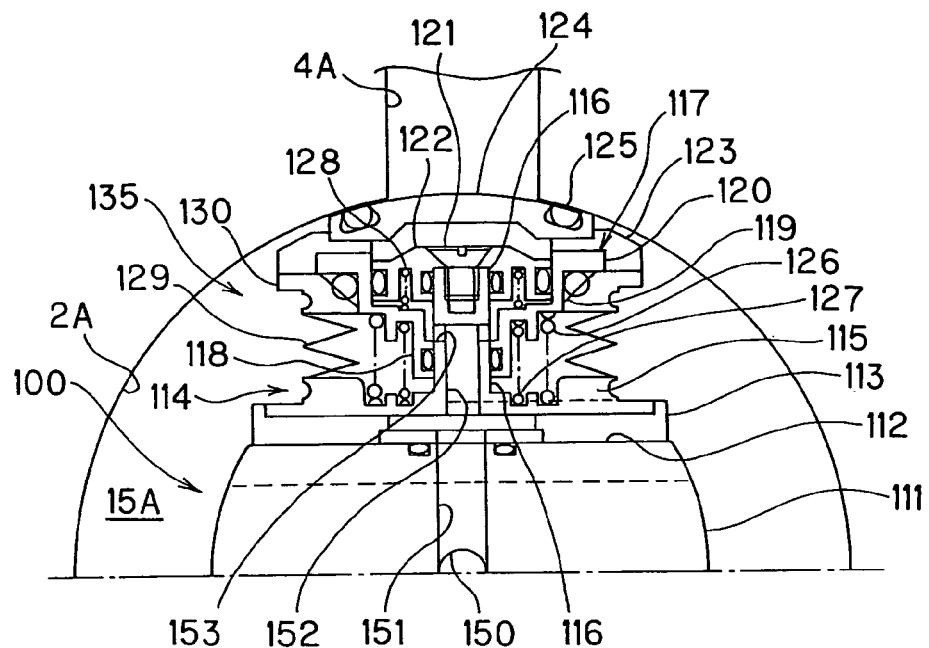
FIG. 11 is an illustration showing an inner structure of an shut-off valve according to another embodiment of the present invention.
Figure 12:
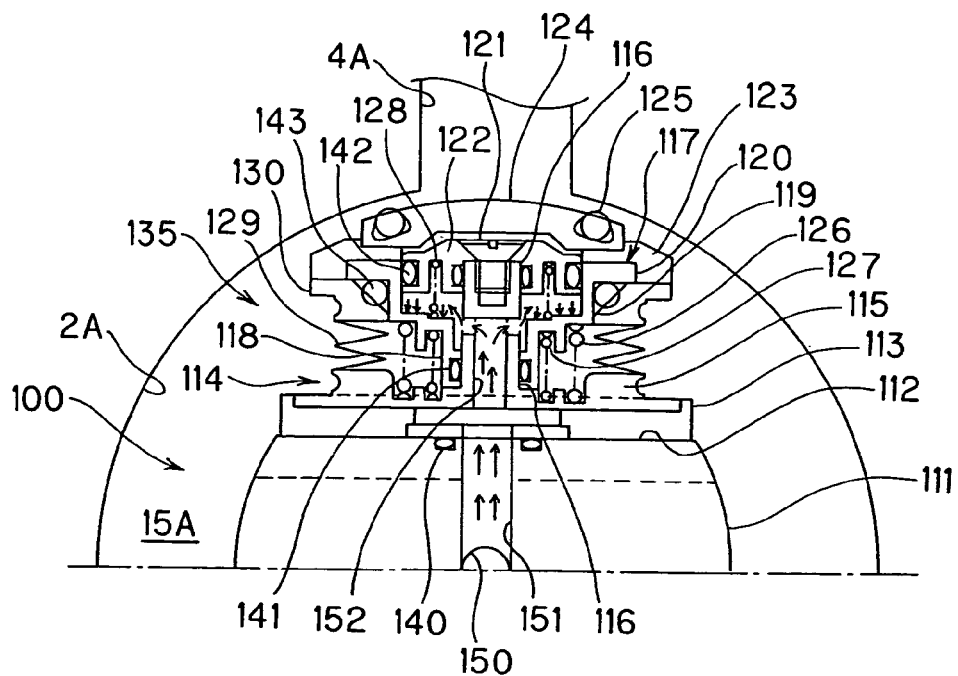
FIG. 12 shows the shut-off valve of FIG. 11 in the opened state.

FIGS. 11 and 12 show an shut-off valve according to another embodiment of the present invention.

With reference to FIGS. 11 and 12, the shut-off valve includes an open/close mechanism 135 having a structure in which a sheet member 124 is always urged by a spring, as urging member, towards a communication port 4A formed to a casing 2A of the shut-off valve, and on the other hand, the sheet member 124 is separated from the communication port 4A by feeding the compressed air.

The communication ports 4A are formed to both facing surfaces of the casing 2A of the shut-off valve so as to communicate the inside and outside the casing 2A, and the inside of the casing 2A is formed as space 15A.

The shut-off valve of this embodiment is also provided with a spool body 100 including a shaft 111 extending in alignment with the axial direction of the space 15A and the open/close mechanisms 135 disposed symmetrically with respect to the axis of the shaft 111.

Inside the shaft 111, is formed an air passage, for flowing the compressed air, composed of a main passage 150 formed along the central axis of the shaft 111 and a branch passage 151 extending radially outward from the main passage 150.

On the other hand, an outer peripheral surface of the shaft 111 is formed with mount portions 112 for the open/close mechanisms 135 on both sides symmetrically with respect to the central axis of the shaft 111. In addition, a mount member 113 integrally formed with the shaft 111 and a support member 114 integrally held by this mount member 113 are disposed to the mount portion 112 in its width direction with a space at its central portion.

An O-ring 140 is fitted to a mating surface between the mount member 113 and the mount portion of the shaft 111 on the inner edge side of the mount member 113 for preventing leakage of the compressed air fed through a branch passage 151. On the other hand, the support member 114 is provided with a base supported by the mount member 113 and a column 116 projecting radially outward at the central portion of the base 115. The column 116 has a central portion formed with an air passage 152 communicated with the branch passage 151 of the shaft 111 so as to pass the compressed air therethrough, and a disc-shaped end flange 122 is fixed to an upper end portion of the column 116 by means of plate screw 121.

A piston 117 is mounted on the outer peripheries of the column 116 and the end flange 122 to be slidably movable in the axial direction of the column 116. The piston 117 has a cylindrical structure having inner hollow portion and including a small diameter sleeve portion 118 and a large diameter sleeve portion 119. The small diameter sleeve portion 118 is fitted around the outer periphery of the column 116 and the large diameter sleeve portion 119 is fitted around the outer periphery of the end flange 122. Air space is defined between the inner peripheral surface of the piston 117 and the outer periphery of the column 116 and between the inner peripheral surface of the piston 117 and the lower surface of the end flange 122, and the air space is formed as sealed space in which the compressed air is sealed. Furthermore, the column 116 is formed with an air passage 152 at an axial position corresponding to the location to the air space and a communication portion 153 so as to be communicated with the air space to thereby feed the compressed air into the air space.

On the other hand, the large diameter sleeve portion 119, fitted around the end flange 122, of the piston 117 is formed with a flanged portion 120 protruding radially outward of the piston 117.

A sheet member 124 is provided for the flanged portion 120 through a coupling member 123, and the sheet member 124 is a member, as in the above-mentioned embodiment, for opening and closing the communication port 4A by abutting against or separating from the communication port 4A formed to the casing 2A. This sheet member 124 has a circular-arc shaped outer shape having an outer edge portion protruding slightly outward of the communication port 4A, and an O-ring 125 is fitted at a slightly outside portion of the communication port 4A so as to surround the same. Of course, as mentioned hereinbefore, such arrangement of the sheet member 124 is applied to each of the communication ports 4A.

The sheet member 124 is fixed to the piston 117 by the coupling member 123 which is disposed so as to extend in the axial direction of the flange of the shaft 111. The coupling member 123 has a lower surface provided so as to clamp the flanged portion 120 of the piston 117 and has an upper surface fixing the lower surface of the sheet member 124, whereby each sheet member 124 is integrally coupled with the piston 117.

Furthermore, in each of the open/close mechanisms 135, two springs 126 and 127 are fitted between the piston 117 and the base 115 of the support member 114 so as to urge the piston 117 outward in the axial direction of the column 116. These springs include a large diameter spring 126 and a small diameter spring 127 disposed substantially coaxially. In addition, a further spring 128 is disposed in the air space between the piston 117 and the end flange 122, the spring 128 acting to push the piston with a weak force towards the shaft 111 side from the end flange 122, thus providing a function as a damper.

A bellows 129 is also arranged so as to connect the piston 117 and the base 115 of the support member 114 and to surround the outer periphery of the open/close mechanism 135. The bellows 129 has a shape foldable inward and outward and the upper portion thereof is attached to the outer peripheral surface of the piston 117, and on the other hand, the lower portion thereof is closely contacted to the upper surface of the base 115 of the support member 114.

Furthermore, a disc-shaped support plate 130 having an inner central hole is provided for the upper portion of the bellows 129, and this support plate 130 is fitted to the outer peripheral surface of the piston 117. An O-ring 143 is further mounted to the mating portion between the piston 117 and the support plate 130 to thereby prevent the leakage of air through this mating portion.

The spool body 100 in this embodiment acts in the following manner, in which the revolution motion of the spool body 100 is substantially the same as that of the former embodiment, so that only the operation of the open/close mechanism(s) 135 will be described herein.

FIG. 11 shows the state that the sheet members 124 of the open/close mechanisms 135 close the communication ports 4A formed to the casing 2A. In such state, each of the pistons 117 is urged towards the communication port (4A) side by the springs 126 and 127 fitted between the piston 117 and the base 115 of the support member 114, thereby pushing the sheet member 124 provided for the piston 117 towards the communication port (4A) side through the coupling member 123. Further, since the O-ring 125 is mounted to the outer peripheral surface of the sheet member 124, the O-ring 125 seals the communication port 4A, which is hence tightly closed.

From the state mentioned above, when the compressed air is fed into the air space through the air passages 150, 151 of the shaft 111, the air passage 152 of the column 116 and the communication portion 153, the piston 117 is pushed back towards the shaft (111) side by the urging force of the spring 128 disposed in the air space, in addition to the pressurizing force of the thus fed compressed air, as shown in FIG. 12, against the urging force of these two springs 126, 127. In this instance, since the piston 117 is coupled with the sheet member 124 through the coupling member 123, the piston is pushed backward towards the shaft (111) side, and then, the sheet member 124 closing the communication port 4A is moved so as to separate from the inner surface of the casing 2A, thus opening the closed communication port 4A.

Then, by stopping the feeding of the compressed air and sucking the compressed air fed into the air space, two springs 126, 127 again push the piston 117 towards the communication port 4A side. In this operation, the spring 128 disposed inside the air space functions as a damper so as to prevent the sheet member 124 from violently colliding with the inner surface of the casing 2A, whereby the O-ring 125 mounted to the outer peripheral surface of the sheet member 124 can be protected.

By repeating such operations as mentioned above, the communication ports 4A formed to both sides of the casing 2A can be opened or closed. During such operations, the bellows 129 is expanded or shrunken in accordance with the reciprocal motion of each piston 117. Moreover, the lower portion of the bellows 119 is closely contacted to the base 115 of the support member 114, and on the other hand, at the upper portion thereof, the O-ring 143 is fitted to the mating surface between the support plate 130 and the piston 117. Accordingly, desirable closed and sealed condition of the inside of the bellows 129 can be ensured and maintained.

It is to be noted that the present invention is not limited to the embodiments described above and many other changes and modifications may be made without departing from the scopes of the appended claims.

For example, although, in the above embodiments, the shut-off valve having the spool body (valve body) accommodated in the casing was explained, the present invention is not limited to such embodiments, and a structure in which only the spool body is inserted inside the vacuum chamber to thereby directly open or close the opening of the vacuum chamber may be adopted. In such example, it may be better to locate a shell portion inside the vacuum chamber.

What is claimed is:

1. A shut-off valve disposed between each opening of a pair of vacuum chambers comprising:

an elongated casing having an elongated cylindrical space therein and formed with a slot at each of its opposing sides so as to be elongated in its axial direction;

a valve body disposed lengthwise in the cylindrical space and having a shaft rotating around a central axis of the valve body and a communication passage penetrating therethrough in its diameter direction so as to communicate with each opening of the vacuum chambers;

a drive unit for driving the valve body to rotate the shaft and provided at one end of the casing; and an open and close mechanism provided for the shaft for opening and closing each of the openings of the vacuum chambers and disposed at each of portions symmetric with respect to the central axis of the shaft, each portion of the open and close mechanism having:

a sheet member which is an elongated plate-like member and having a circular-arc-shaped outer peripheral surface opposed to an inner surface of the easing for opening and closing each slot of the casing, a plurality of support columns provided at intervals on the shaft for supporting the sheet member reciprocatingly in a radial direction of the shaft, a plurality of urging members for urging the sheet member inward or outward in the radial direction of the shaft, and a seal member connected to the sheet member so as to be associated therewith and forming a sealed space between the sheet member and the shaft and including a plurality of the support columns and the urging members therein, the shaft being formed with an air passage communicating with the sealed space.

2. The shut-off valve according to claim 1, wherein the seal member is an elongated bellows forming one sealed space, and the support columns move reciprocatingly in the radial direction of the shaft by a vacuum operation or compressed air operation.

3. The shut-off valve according to claim 1, wherein the drive unit is provided so as to project horizontally of the vacuum chambers.

4. The shut-off valve according to claim 1, wherein a piston is mounted on each support column for supporting the sheet member via an urging member and another urging member is provided between the piston and the shaft so as to form a sealed space on both sides of the piston, respectively.

* * * * *